United States Patent [19]

Zimmermann et al.

[11] 4,369,281

[45] Jan. 18, 1983

[54] POLYVINYL ALCOHOL COMPOSITION, PROCESS FOR ITS PREPARATION AND ITS USE

[75] Inventors: Wolfgang Zimmermann; Albrecht Harréus, both of Kelkheim, Fed. Rep. of Germany

[73] Assignee: Hoechst Aktiengesellschaft, Frankfurt am Main, Fed. Rep. of Germany

[21] Appl. No.: 261,459

[22] Filed: May 7, 1981

[30] Foreign Application Priority Data

May 9, 1980 [DE] Fed. Rep. of Germany ....... 3017744
Mar. 16, 1981 [DE] Fed. Rep. of Germany ....... 3110166

[51] Int. Cl.$^3$ ............................................. C08K 5/05
[52] U.S. Cl. ...................................... 524/379; 525/58
[58] Field of Search ................. 260/29.6 WA, 29.6 B; 525/58; 524/379

[56] References Cited

U.S. PATENT DOCUMENTS 4,119,604  10/1978  Wysong .......................... 260/33.2 R

FOREIGN PATENT DOCUMENTS 4587      3/1979  European Pat. Off. .
922458    4/1963  United Kingdom .
922459    4/1963  United Kingdom .

Primary Examiner—Joseph L. Schofer
Assistant Examiner—Bernard Lipman
Attorney, Agent, or Firm—Curtis, Morris & Safford

[57] ABSTRACT

A molding composition on the basis of polyvinyl alcohol substantially consists of a partially solvolyzed graft copolymer of a vinyl ester and a polyethylene glycol or of a mixture of such graft copolymer with a partially solvolyzed polyvinyl ester as well as of water and optionally a polyhydric alkanol. The composition is obtained by mixing the granular polymers used in each case with the other components. It is water-soluble, flowable and thermoplastically workable and is suitable for the preparation of any shaped articles, especially sheets.

9 Claims, No Drawings

POLYVINYL ALCOHOL COMPOSITION, PROCESS FOR ITS PREPARATION AND ITS USE

The invention relates to a water-soluble, flowable and thermoplastically workable polyvinyl alcohol composition, a process for the preparation of this composition and its use.

The preparation of water-soluble, modified polyvinyl alcohols (PVAL) by solvolysis of a graft copolymer, of one or several vinyl esters onto polyalkylene glycols is already known (see German Pat. Nos. 1,081,229 and 1,094,457=British Pat. Nos. 922 458 and 922 459). The products obtained by this process contain at least 50 percent by weight or less than 50 percent by weight of vinyl alcohol units; they are suitable as material for the preparation of soft, transparent sheets, easily soluble in water and capable of being processed from a solution as well as thermoplastically. In the preparation of sheets, however, processing temperatures of at least 200° C. are required, which causes partial decomposition and coloring of the material. Furthermore, the polymer melt is inhomogeneous, which in the extrusion blowing process may lead to the formation of unstable sheet bubbles and inhibit a continuous processing of the material by extrusion or injection molding.

Furthermore, a plasticizer-containing polyvinyl alcohol is known which contains the plasticizer in homogenous distribution and substantially consists of particles with a diameter of from 0.4 to 4 mm (see European Patent Publication No. 4,587). In this case intermixing of the plasticizer is carried out in the presence of a small amount of water, insufficient for dissolving the polyvinyl alcohol, and during the mixing operation the temperature is increased and decreased in such a manner that the polyvinyl alcohol particles swell and temporarily agglomerate. The known polyvinyl alcohol granules are suitable for the preparation of shaped articles of any kind, especially sheets.

It is the object of the invention to provide a molding composition on the basis of polyvinyl alcohol, which is water-soluble and flowable and capable of being processed thermoplastically in an easy and especially continuous manner and which is suitable as material for the preparation of sheets.

The invention relates to a water-soluble, flowable and thermoplastically workable polyvinyl alcohol composition consisting of from (a) 60 to 98 percent by weight of a partially solvolyzed graft copolymer of a vinyl ester and a polyethylene glycol having a molecular weight of from 5,000 to 1,000,000, the viscosity of the 4 percent by weight aqueous solution of the partially solvolyzed graft copolymer being of from 3 to 40 mPa.s (measured at a temperature of 20° C.), (b) 2 to 40 percent by weight of water and (c) 2 to 20 percent by weight of a polyhydric alkanol having a melting point of from 25° to 100° C.

The invention furthermore relates to a process for the preparation of a water-soluble, flowable and thermoplastically workable polyvinyl alcohol composition, wherein from (a) 60 to 98 parts by weight of a partially solvolyzed granular graft copolymer of a vinyl ester and a polyethylene glycol, having a molecular weight of from 5,000 to 1,000,000, the viscosity of the 4 percent by weight aqueous solution of the partially solvolyzed graft copolymer being of from 3 to 40 mPa.s (measured at a temperature of 20° C.), (b) 2 to 40 parts by weight of water and (c) 2 to 20 parts by weight of a polyhydric alkanol having a melting point of from 25° to 100° C. are intensely and homogeneously mixed at a temperature of from 20° to 60° C.

The invention furthermore relates to a method for the preparation of water-soluble shaped articles, especially sheets, which comprises using as starting material a water-soluble, flowable and thermoplastically workable polyvinyl alcohol composition, consisting of from (a) 60 to 98 percent by weight of a partially solvolyzed graft copolymer of a vinyl ester and a polyethylene glycol having a molecular weight of from 5,000 to 1,000,000, the viscositiy of the 4 percent by weight aqueous solution of the partially solvolyzed graft copolymer being of from 3 to 40 mPa.s (measured at a temperature of 20° C.), (b) 2 to 40 percent by weight of water and (c) 2 to 20 percent by weight of a polyhydric alkanol having a melting point of from 25° to 100° C.

A special embodiment of the invention relates to a water-soluble, flowable and thermoplastically workable polyvinyl alcohol composition consisting of from (a) 30 to 95 percent by weight of a partially solvolyzed graft copolymer of a vinyl ester and a polyethylene glycol having a molecular weight of from 5,000 to 1,000,000, the viscosity of the 4 percent by weight aqueous solution of the partially solvolyzed graft copolymer being of from 3 to 40 mPa.s (measured at a temperature of 20° C.), (b) 2 to 40 percent by weight of water, (c) 2 to 20 percent by weight of a polyhydric alkanol having a melting point of from 25° to 100° C. and (d) 3 to 60 percent by weight of a partially solvolyzed polyvinyl ester having an ester number of from 50 to 280 mg KOH/g, the viscosity of the 4 percent by weight aqueous solution of the partially solvolyzed polyvinyl ester being of from 3 to 40 mPa.s (measured at a temperature of 20° C.).

The process for the preparation of this particular composition is analogous to the process mentioned above for the preparation of the composition consisting of the components (a), (b) and (c).

The modified graft copolymer used according to the invention is prepared in known manner by partially solvolyzing a graft copolymer obtained by grafting one vinyl ester or several vinyl esters onto a polyalkylene glycol (see, for for example, German Pat. Nos. 1,081,229 and 1,094,457). Solvolysis is conveniently carried out with an alkanol, especially methanol (methanolysis). As polyalkylene glycol there is used polyethylene glycol usually having an average molecular weight (average weight) of from 5,000 to 1,000,000 and especially from 10,000 to 50,000. As vinyl ester there is preferably used a vinyl ester the acid component of which has 2, 3 or 4 carbon atoms, i.e. vinyl acetate, vinyl propionate and vinyl butyrate. Vinyl acetate is especially preferred. The degree of polymerization (average weight) of the partially solvolyzed graft copolymer is in the range of from 300 to 3,000, preferably from 400 to 2,000. The viscosity of the 4 percent by weight aqueous solution of the partially solvolyzed graft copolymer is 3 to 40 mPa.s, preferably 3 to 15 mPa.s (measured at a temperature of 20° C.).

A partially solvolyzed graft copolymer, having from 40 to 80 percent by weight, preferably 50 to 70 percent by weight, of vinyl alcohol units, 5 to 35 percent by weight, preferably 10 to 30 percent by weight, of vinyl acetate units and 10 to 50 percent by weight, preferably 30 to 50 percent by weight, of ethylene oxide units, is especially preferred. The ester number of the partially solvolyzed graft copolymer is in the range of from 50 to 250 mg KOH/g, preferably from 100 to 200 mg KOH/g.

The polyvinyl alcohol composition according to the invention consists of from 60 to 98 percent by weight, preferably 70 to 95 percent by weight, of the partially solvolyzed graft copolymer mentioned above, 2 to 40 percent by weight, preferably 2 to 20 percent by weight, of water and 2 to 20 percent by weight of a polyhydric alkanol having a melting point in the range of from 25° to 100° C.

The amount of water contained in the composition shall be insufficient for the dissolution of the partially solvolyzed graft copolymer at a temperature of 50° C.

The partially solvolyzed polyvinyl ester being component (d) of the particular composition according to the invention is likewise obtained by solvolysis with an alkanol, preferably methanol. A polymer of a vinyl ester with 2, 3 or 4 carbon atoms in the acid component, i.e. preferably polyvinyl acetate as well as polyvinyl propionate and polyvinyl butyrate is especially suitable as polyvinyl ester. The viscosity of the 4 percent by weight aqueous solution of the partially solvolyzed polyvinyl ester is 3 to 40 mPa.s, preferably 4 to 20 mPa.s (measured at a temperature of 20° C.). The ester number of the partially solvolyzed polyvinyl ester is in the range of from 50 to 280 mg KOH/g, preferably from 100 to 260 KOH/g.

The polyvinyl alcohol composition according to the invention, consisting of the components (a) to (d), preferably contains from 35 to 90 percent by weight of the partially solvolyzed graft copolymer, from 2 to 20 percent by weight of water, 2 to 20 percent by weight of the polyhydric alkanol and from 5 to 50 percent by weight of the partially solvolyzed polyvinyl ester.

The polyvinyl alcohol composition according to the invention contains a polyhydric alkanol which preferably contains from 2 to 5 hydroxyl groups, having a melting point of from 25° to 100° C., preferably from 50° to 100° C. Especially suitable alkanols are polyalkylene glycols, preferably polyethylene glycol, with an average molecular weight (average weight) of from 100 to 50,000, preferably from 100 to 25,000. Further examples are neopentyl glycol, pentaerythritol, anhydro enneaheptitol and especially trimethylol propane. The presence of such an alkanol extraordinarily improves the thermoplastic processibility of the modified graft copolymer.

Furthermore, the polyvinyl alcohol composition according to the invention may contain auxiliaries which facilitate the thermoplastic processibility of the composition. The total amount of such auxiliaries is at most 3 percent by weight, preferably 0.04 to 1 percent by weight (relative to the polyvinyl alcohol composition). Suitable auxiliaries are, especially, lubricants such as stearic acid, waxes, fine-particle organosiliconized silicic acids, preferably pyrogene silicic acids which are partially reacted with organosilanes, as well as alkaline earth metal stearates, preferably calcium stearate. Furthermore, the composition may also contain known antioxidants and dyestuffs.

The polyvinyl alcohol composition according to the invention is usually obtained by homogenous intermixing of the individual components with each other. In this process the components (a) and optionally (d) are used each in the form of a granular material wherein preferably at least 70 percent by weight of the particles have a diameter of 0.2 to 3.5 mm. Especially suitable is a granular material, wherein at least 90 percent by weight of the particles have a diameter of from 0.2 to 3.0 mm. The polymers (a) and (d) are intensely and homogeneously mixed with the water and optionally with other components at a temperature of at most 60° C., preferably at most 50° C., it being advantageous to increase and decrease again the temperature of the mixture during the mixing operation in such a manner that the polymer particles can swell and temporarily agglomerate. For this purpose, the temperature of the mixture is first continuously increased to a maximum starting from room temperature, and then decreased again, thus during the temperature rise possibly causing the formation of loose polyvinyl alcohol agglomerates which easily decompose after the temperature maximum has been passed. The temperature is increased and decreased preferably in about similar periods of time.

Mixing is usually carried out in a device which ensures intense and permanent intermixing of the reaction components. Especially suitable are forced circulation mixers provided with vertically or horizontally arranged agitators, and planetary mixers.

Advantageously, the mixers are provided with a heating device. The temperature rise is ensured by friction or jacket heating, depending on the kind of mixing equipment. The process of the invention may likewise be carried out continuously, preferably in a horizontally positioned reaction tube with paddle agitator or screw, or in a continuously operating kneader, each being provided with the necessary heating and cooling zones. Depending on the kind and the amount of the components and the kind of mixing equipment, a period of from 3 to 30 minutes is required for the entire mixing operation.

The polyvinyl alcohol composition according to the invention can be processed thermoplastically without any difficulty, for example by molding, injection molding and extrusion. It is suitable for the preparation of any shaped articles, for example plates, tubes, profiles, fibers and, especially, sheets which are very easily soluble in water. This is surprising since higher molecular polyethylene glycols, as is known, are not compatible with polyvinyl alcohol and even form water-insoluble coacervates.

A special advantage of the sheets according to the invention which usually have a thickness of from 10 to 100 μm, preferably from 20 to 50 μm, is their good resistancy to chemicals so that even chemistry aggressive substances can be stored in recipients made of such sheets. Such aggressive substances are especially substances which react with water or have a strongly oxidizing or reducing action, for example phosphorous pentachloride, sodium hydroxide, sodium chlorite, sodium disulfite, potassium permanganate, hydroxylammonium chloride, silver nitrate, borax, potassium fluoroborate, glyoxal hydrate, amidosulfonic acid and paraformaldehyde. These recipients preferably are bags which envelop the substances and can be closed by heat-sealing. The bags are conveniently packed each into another bag consisting of a sheet of water-insoluble material, preferably polyethylene; this sheet usually has a thickness of from 50 to 200 μm, preferably of from 75 to 150 μm.

The invention is illustrated by the following examples. Percentages are given by weight.

EXAMPLE 1

6 kg of a partially solvolyzed granular graft copolymer consisting of 50 percent of vinyl alcohol units and 25 percent of vinyl acetate and ethylene oxide units each, with an ester number of 160 mg KOH/g, the 4 percent aqueous solution of which has a viscosity of 4.0 mPa.s (measured at 20° C.) are introduced into a 30 l forced circulation mixer (manufactured by Messrs. Papenmeier, Detmold). 70 Percent of the graft copolymer consist of particles with a diameter in the range of from 0.3 to 2.6 mm. The graft copolymer is mixed, while stirring, with a solution of 180 g of polyethylene glycol (average molecular weight of 20,000) having a temperature of 40° C., in 180 g of water, at a speed of the agitator of 1,200 min$^{-1}$. After 4 minutes the temperature of the mixture has risen to 40° C. After a total of 5 minutes, 36 g of a commercial pyrogene silicic acid, partially substituted with organosilanol groups, are introduced into the mixture while stirring. After cooling an easily flowable, dust-free and tack-free granular material is obtained.

EXAMPLE 2

6 kg of the partially saponified graft copolymer according to Example 1 are introduced into the mixing device described in Example 1. The graft copolymer is mixed with a solution of 180 g of trimethylol propane in 180 g of water while stirring, the speed of the agitator being 600 min$^{-1}$. Within 5 minutes the temperature of the mixture rises to 45° C. An easily flowable and tack-free granular material is obtained.

EXAMPLE 3

6 kg of the partially saponified graft copolymer according to Example 1 are introduced into the mixing device described in Example 1 and within 1 minute 360 g of water are added while stirring at a speed of the agitator of 600 min$^{-1}$. Within another 5 minutes the temperature of the mixture rise 50° C. Subsequently, 36 g of the silicic acid described in Example 1 are introduced into the mixture while stirring. After cooling an easily flowable, dust-free and tack-free granular material is obtained.

EXAMPLE 4

(Example of Application)

The composition obtained according to Example 1 is processed to give a tube by the aid of a commercial extruder (25 D) at a rotation speed of the screw of 50 min$^{-1}$ at a temperature range between 186° and 142° C. (head), a cylinder pressure of 110 bars, an output of 65 g.min$^{-1}$ and a draw-off speed of 5 m.min$^{-1}$, which tube is subsequently inflated at a ratio of 1:7, flattened and wound up. A clearly transparent, tack-free, easily water-soluble blown film of the extruded material with a thickness of 30 μm is obtained.

EXAMPLE 5

(Example of Application)

Conical cups with a weight of 19 g each are manufactured by the aid of a commercial injection molding machine from the composition obtained according to Example 1. The conditions of the process are as follows: injection time 5 s, dwell time 4 s, cooling time 20 s, interval 2 s, plastification 3 s, injection pressure 130 bars, dwell pressure 130 bars, back pressure 40 bars, temperature of the die during molding 70° C., temperature of the ejector during molding 25° C.

EXAMPLE 6

4.8 kg of a granular, partially solvolyzed graft copolymer containing 50 percent of vinyl alcohol units and 25 percent of vinyl acetate and ethylene oxide units each, the 4 percent aqueous solution of which has a viscosity of 4 mPa.s at 20° C., and 1.2 kg of a granular, partially solvolyzed polyvinyl acetate having an ester number of 225 mg KOH/g, the 4 percent aqueous solution of which has a viscosity of 18 mPa.s at 20° C., are introduced into a usual forced circulation mixer. 75 Percent of both polymers consist of particles with diameters in the range of from 0.3 to 2.8 mm. The Polymer mixture is mixed while stirring with a solution of 180 g of polyethylene glycol (average molecular weight of 20,000) in 180° C. of water at a speed of the agitator of 1,200 min$^{-1}$, the temperature of the solution being 40° C. After 4 minutes the temperature of the mixture has reached 40° C. After a total of 5 minutes, 36 g of a commercial pyrogene silicic acid, which is partially substituted with organosilanol groups, are introduced into the mixture while stirring. After cooling, an easily flowable, dust-free and tack-free granular material is obtained from which a sheet with a thickness of 30 μm is manufactured by extrusion blowing.

EXAMPLE 7

The process of Example 6 is repeated with a mixture of 4 kg of the partially solvolyzed graft copolymer and 2 kg of the partially solvolyzed polyvinyl acetate. An easily flowable, dust-free and tack-free granular material is obtained from which a sheet with a thickness of 30 μm is manufactured.

EXAMPLE 8

(Example of Application)

Bags of the size of 4 cm×8 cm are manufactured from the sheets (1) and (2) obtained according to the Examples 6 and 7. The bags are filled with different aggressive substances and closed by heat-sealing. These bags are enveloped by bags of a polyethylene sheet of a thickness of 100 μm, which are also closed by heat-sealing. After a storage time of 4 weeks in a conditioned room at a temperature of 23° C. and a relative humidity of 50%, appearance and water solubility at 20° C. of the bags are tested. For comparison, corresponding bags made of a sheet (3) obtained by extrusion blowing of a partially solvolyzed polyvinyl acetate (ester number: 140 mg KOH/g; viscosity of the 4 percent aqueous solution at 20° C.:18 mPa.s) are filled with the same substances and closed by heat-sealing. Storage and testing are carried out correspondingly.

The results can be seen from the following table.

| Aggressive substance | Appearance (1) (2) | (3) | Water solubility (min) (1) | (2) | (3) |
|---|---|---|---|---|---|
| Paraformaldehyde | unchanged | unchanged | 5 | 5 | 15 |
| Amidosulfonic acid | " | " | 5 | 5 | 15 |
| Borax | " | " | 10 | 15 | insoluble |
| Glyoxal hydrate | " | embrittled | 10 | 15 | insol- |

-continued

| Aggressive substance | Appearance (1) (2) | (3) | Water solubility (min) (1) | (2) | (3) |
|---|---|---|---|---|---|
| Hydroxylammoniumchloride | " | unchanged | 5 | 5 | uble 15 |
| Potassium fluoroborate | " | " | 5 | 5 | 15 |
| Potassium permanganate | " | brown | 5 | 6 | 30 |
| Sodium disulfite | " | unchanged | 5 | 6 | 20 |
| Silver nitrate | brown | brown-black | 6 | 7 | 30 |
| Phosphorous pentachloride | yellowish | brown | 6 | 7 | insoluble |
| Sodium chlorite | unchanged | embrittled | 5 | 6 | 45 |
| Sodium hydroxide | yellow | yellow | 5 | 7 | insoluble |

What is claimed is:

1. Water-soluble, flowable and thermoplastically workable polyvinyl alcohol composition consisting of
   (a) 60 to 98 percent by weight of a partially solvolyzed graft copolymer of a vinyl ester and a polyethylene glycol having a molecular weight of from 5,000 to 1,000,000, the viscosity of the 4 percent by weight aqueous solution of the partially solvolyzed graft copolymer being of from 3 to 40 mPa.s (measured at a temperature of 20° C.),
   (b) 2 to 40 percent by weight of water and
   (c) 2 to 20 percent by weight of a polyhydric alkanol having a melting point of from 25° to 100° C.

2. The polyvinyl alcohol composition of claim 1, wherein the graft copolymer is a graft copolymer of vinyl acetate and a polyethylene glycol, having from 40 to 80 percent by weight of vinyl alcohol units, 5 to 35 percent by weight of vinyl acetate units and 10 to 50 percent by weight of ethylene oxide units.

3. The polyvinyl alcohol composition of claim 1, wherein the polyhydric alkanol is a branched alkanol having from 4 to 10 carbon atoms and 2, 3 or 4 hydroxyl groups, or a polyethylene glycol.

4. Process for the manufacture of a water-soluble, flowable and thermoplastically workable polyvinyl alcohol composition, wherein
   (a) 60 to 98 parts by weight of a granular, partially solvolyzed graft copolymer of a vinyl ester and a polyethylene glycol having a molecular weight of from 5,000 to 1,000,000, the viscosity of the 4 percent by weight aqueous solution of the partially solvolyzed graft copolymer being of from 3 to 40 mPa.s (measured at a temperature of 20° C.),
   (b) 2 to 40 parts by weight of water and
   (c) 2 to 20 parts by weight of a polyhydric alkanol having a melting point of from 25° to 100° C. are intensely and homogeneously mixed at a temperature of from 20° to 60° C.

5. The process of claim 4, wherein there is used as partially solvolyzed graft copolymer a granular material at least 70 percent by weight of which being particles having diameters in the range of from 0.2 to 3.5 mm.

6. Water-soluble, flowable and thermoplastically workable polyvinyl alcohol composition consisting of
   (a) 30 to 95 percent by weight of a partially solvolyzed graft copolymer of a vinyl ester and a polyethylene glycol having a molecular weight of from 5,000 to 1,000,000, the viscosity of the 4 percent by weight aqueous solution of the partially solvolyzed graft copolymer being from 3 to 40 mPa.s (measured at a temperature of 20° C.),
   (b) 2 to 40 percent by weight of water,
   (c) 0 to 20 percent by weight of a polyhydric alkanol having a melting point of from 25° to 100° C. and
   (d) 3 to 60 percent by weight of a partially solvolyzed polyvinyl ester having an ester number of from 50 to 280 mg KOH/g, the viscosity of the aqueous solution of the partially solvolyzed polyvinyl ester being from 3 to 40 mPa.s (measured at a temperature of 20° C.).

7. Process for the manufacture of a water-soluble, flowable and thermoplastically workable polyvinyl alcohol composition, wherein
   (a) 30 to 95 parts by weight of a granular partially solvolyzed graft copolymer of a vinyl ester and a polyethylene glycol having a molecular weight of from 5,000 to 1,000,000, the viscosity of the 4 percent by weight aqueous solution of the partially solvolyzed graft copolymer being from 3 to 40 mPa.s (measured at a temperature of 20° C.),
   (b) 2 to 40 parts by weight of water,
   (c) 2 to 20 parts by weight of a polyhydric alkanol having a melting point of from 25° to 100° C. and
   (d) 3 to 60 parts by weight of a granular partially solvolyzed polyvinyl ester having an ester number of from 50 to 280 mg KOH/g, the viscosity of the 4 percent by weight aqueous solution of the partially solvolyzed polyvinyl ester being from 3 to 40 mPa.s (measured at a temperature of 20° C.) are intensely and homogeneously mixed with one another at a temperature of from 20° to 60° C.

8. Method for the preparation of a water-soluble shaped article which comprises using as starting material the polyvinyl alcohol composition according to claims 1 or 6.

9. Sheet, prepared from the polyvinyl alcohol composition according to claims 1 or 6.

* * * * *